United States Patent
Nguyen et al.

(10) Patent No.: US 9,037,748 B2
(45) Date of Patent: May 19, 2015

(54) METHOD AND APPARATUS FOR DETERMINING THE SWITCH PORT TO WHICH AN END-NODE DEVICE IS CONNECTED

(75) Inventors: Ted T. Nguyen, Roseville, CA (US); Sarayu Srinivas Chandrapal, Roseville, CA (US)

(73) Assignee: Hewlett-Packard Development Company, Houston, TX (US)

( * ) Notice: Subject to any disclaimer, the term of this patent is extended or adjusted under 35 U.S.C. 154(b) by 1602 days.

(21) Appl. No.: 11/443,154

(22) Filed: May 31, 2006

(65) Prior Publication Data

US 2007/0283045 A1    Dec. 6, 2007

(51) Int. Cl.
  *G06F 15/173*  (2006.01)
  *H04L 12/26*   (2006.01)
  *H04L 12/24*   (2006.01)

(52) U.S. Cl.
  CPC ......... H04L 43/0811 (2013.01); *H04L 41/0213* (2013.01); *H04L 41/12* (2013.01); *H04L 41/22* (2013.01)

(58) Field of Classification Search
  None
  See application file for complete search history.

(56) References Cited

U.S. PATENT DOCUMENTS

| | | | |
|---|---|---|---|
| 5,796,736 A * | 8/1998 | Suzuki ........................ | 370/254 |
| 6,108,782 A * | 8/2000 | Fletcher et al. .............. | 713/153 |
| 6,628,623 B1 * | 9/2003 | Noy ............................. | 370/255 |
| 6,906,734 B2 * | 6/2005 | Subramanian et al. ....... | 715/736 |
| 2005/0270986 A1 * | 12/2005 | Watanabe et al. ............. | 370/252 |
| 2006/0133274 A1 * | 6/2006 | Lee et al. ...................... | 370/230 |
| 2007/0133576 A1 * | 6/2007 | Tsuge et al. .................. | 370/401 |
| 2007/0136458 A1 * | 6/2007 | Boyd et al. ................... | 709/224 |
| 2007/0192704 A1 * | 8/2007 | Bauman et al. ............... | 715/735 |
| 2008/0155424 A1 * | 6/2008 | Moran et al. .................. | 715/736 |

OTHER PUBLICATIONS

Baker, "Netdisco—Network Discovery and Management", Jun. 20, 2004.*
Thoustrup, "Layer 2 topology discovery", Jan. 20, 2006.*

* cited by examiner

Primary Examiner — Jerry Dennison
(74) Attorney, Agent, or Firm — Mannava & Kang, P.C.

(57) ABSTRACT

Apparatus and methods for determining a switching device and port to which a user selected end-node in a computer network is connected may include receiving an address of a user determined end-node and discovering a switching device that forwards traffic to no other device on the same port as the switching device forwards traffic to the selected end-node. The apparatus and methods may output an address of the discovered switching device and port to the user.

22 Claims, 6 Drawing Sheets

METHOD AND APPARATUS FOR DETERMINING THE SWITCH PORT TO WHICH AN END-NODE DEVICE IS CONNECTED

BACKGROUND

A computer network may comprise hundreds or thousands of interconnected devices such as routers, switches, and end-nodes that may include computers, servers and printers. Because of the sheer number of end-nodes, it is an end-node that typically causes network problems due to faulty hardware, virus infestation, and/or too much traffic due to the uploading or downloading of files over the network.

When a problem condition arises, it is generally the responsibility of a network administrator to find and rectify the problem. By locating the switch port to which a problem end-node is physically connected, the port can be disabled thus isolating the end-node from the network. In order to effectively manage the network, a network administrator requires tools to help locate the source of the problem.

Various software products are available to the network administrator to assist in identifying devices which populate discrete network levels. For example, a network administrator's work station executes a network management application, e.g., OPENVIEW™, a software product developed by Hewlett-Packard Co. of Palo Alto, Calif., and periodically queries routers to identify all devices connected to each router port. The network management application, e.g., the OPENVIEW™ product, thus acquires, from each router, identification of hubs and switches that connect to specific router ports and the identity of the ports.

DESCRIPTION OF THE DRAWINGS

The present embodiment is illustrated by way of example, and not by limitation, in the figures of the accompanying drawings, wherein elements having the same reference numeral designations represent like elements throughout and wherein.

DETAILED DESCRIPTION

The described embodiments provide apparatus and methods for providing a user with a switch and/or switch port to which an end-node is connected. Specifically, in an embodiment, the apparatus and methods provide the user with information concerning the switch and/or switch port to which the end-node is physically connected.

Figure 1:
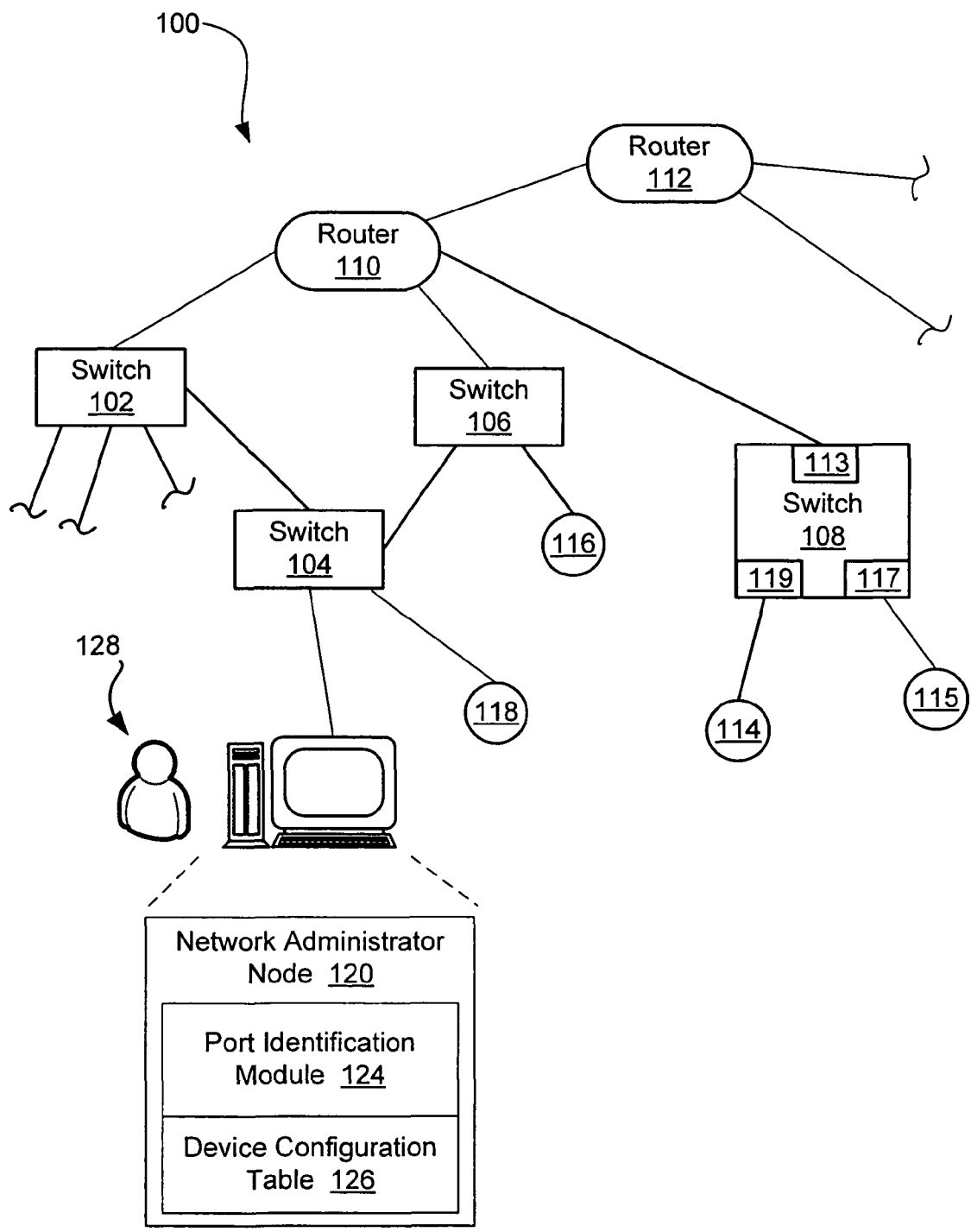
FIG. 1 is a network diagram illustrating an exemplary computer network according to an embodiment.

Referring to FIG. 1, a typical network 100 comprises a plurality of interconnected switching devices, such as routers 110 and 112, and switches 102, 104, 106 and 108. Thousands of end-nodes are connected to ports on the interconnected switching devices and these devices comprise personal computers (PCs) 114, 116, server 118, and printer 115 attached to their respective switching device. For example, PC 114 and printer 115 are physically attached to ports 119 and 117, respectively, on switch 108.

Network 100 may further include any communications network communicatively couplable, at least in part, for enabling communications between the routers, switches, and end-nodes shown on FIG. 1, as well as any other device connected to network 100. Network 100 may include at least one, or any combination, of: a wireless or wired network; a terrestrial telephone network, a satellite network; an infrared network such as an Infrared Data Association ("IrDA")-based network; a short-range wireless network; a BLUETOOTH® technology network; a ZIGBEE® protocol network; an ultra wide band ("UWB") protocol network; a home radio frequency ("HomeRF") network; a shared wireless access protocol ("SWAP") network; a wideband network, such as a wireless Ethernet compatibility alliance ("WECA") network, a 802.xx network; a public switched telephone network; a public heterogeneous communications network, such as the Internet; a private communications network; a land mobile radio network; and other networks.

Network 100 may be administered by network administrator node 120 operated by a network administrator 128. Network administrator node 120 comprises a port identification module 124 that, in the event of a problem with an end-node, is operable to receive end-node identification information inputted by the administrator 120, determine an attached switch and/or switch port physically connected to the end-node corresponding to the end-node identifying information, and output the switch and switch port information to administrator 120. A device configuration table 126, to be discussed below, provides media access control (MAC) address information on interconnected switching devices in network 100 and is used by port identification module 124 to generate queries into switch resident bridge forwarding tables.

While network administrator node 120 is shown as connected to switch 104, it is to be understood that the administrator node 120 may be connected anywhere within network 100, provided that communication between administrator node 120 and all switching devices in the network is enabled.

In some embodiments, port identification module 124 requires no modification of the operating system software executed by the device and uses network management protocols available on network switching devices. Routers and switches typically include SNMP (simple network management protocol) agents enabling the acquisition of data necessary for performing network management functions. Data, including MAC, or ISO layer-2, addresses that are reachable from each switching device, may be stored in information repositories, i.e., SNMP Management Information Bases (MIBs). A Bridge MIB comprises a list of MAC addresses and a port associated with each MAC address through which packets destined for that MAC address are forwarded. The Bridge MIB is indexed by MAC address and although MIBs may be downloaded in their entirety, in some embodiments, the MIB tables are queried exclusive of downloading the entire contents of the MIB table. Querying the MIB with object identifiers (OIDs), such as a MAC address, may in some embodiments, return a single value or an error message if no data is returned.

In addition to network queries, i.e., SNMP commands, the port identification module 124 may take advantage of link layer discovery protocol (LLDP) agents available in many switching devices. LLDP agents permit a MIB, indexed by port number, to return all network device forwarded packets on a specified port, thereby verifying whether a specific port is physically attached to an end-node.

Network switching devices may also support a link management protocol such as a Spanning Tree Protocol (STP) that provides path redundancy while preventing undesirable loops in the network. Used in conjunction with SNMP and LLDP, a STP-enabled port would be indicative of a switch or a router connected port and not an end-node attached port.

In some embodiments, in order to determine the connectivity of the end-node, all potential connected interconnected devices need to be discovered. However, address forwarding tables typically employ an aging mechanism that discards infrequently encountered destination MAC addresses from an address cache. Thus, sets of MAC addresses found in these tables may not necessarily be complete.

To ensure that the address forwarding tables are adequately populated, the port identification module 124 may generate extra network traffic, using for example, known internet protocol (IP) "ping" or "ping sweep" mechanisms. A mechanism for generating network traffic may be performed by a network management application such as OPENVIEW™. Mounted on another node of network 100, or on network administrator node 120, network management application 125 enables discovery of potential connected interconnected devices.

Figure 2:
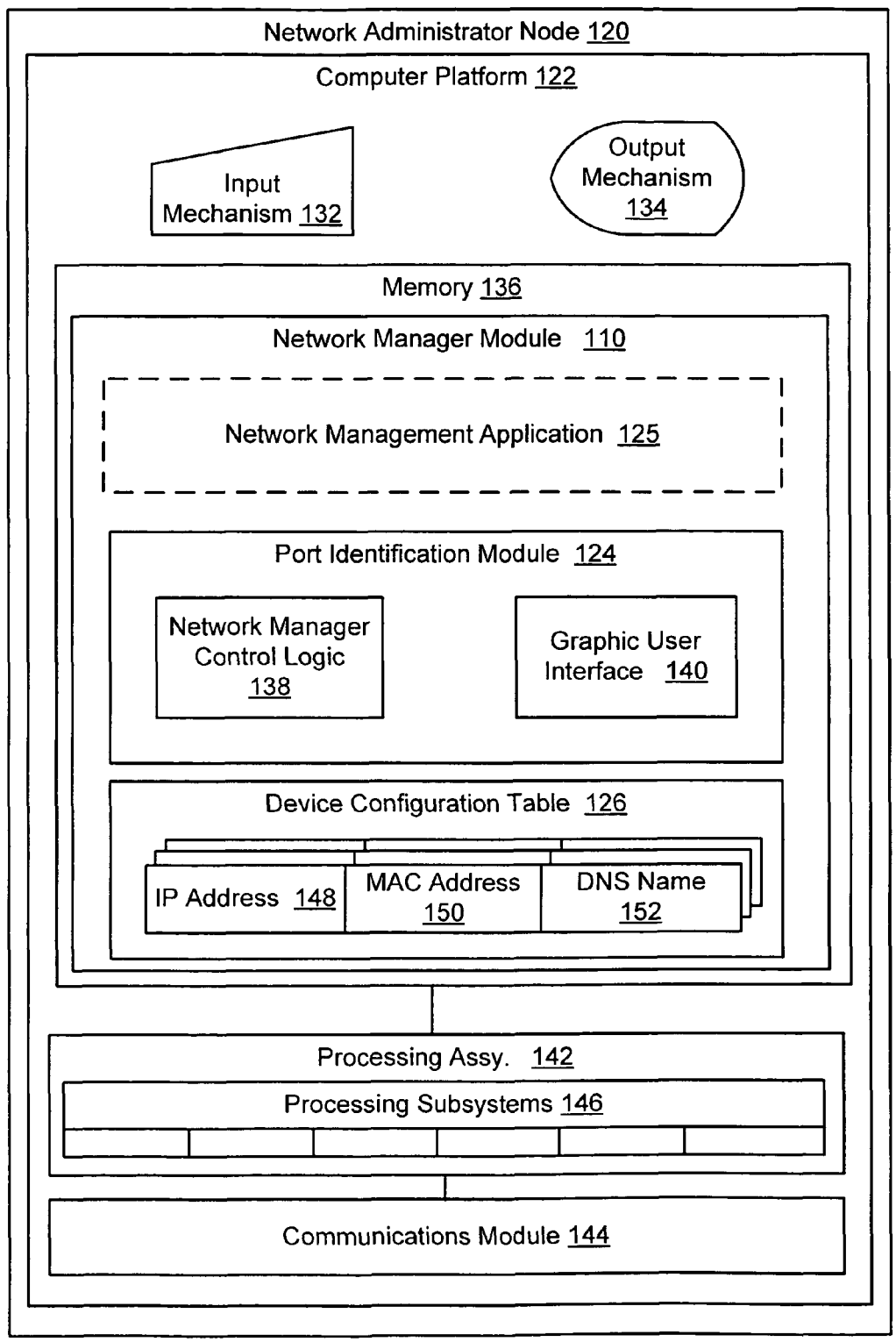
FIG. 2 is a block diagram of a network administrator device according to an embodiment.

Referring now to FIG. 2, network administrator node 120 comprises a processing device having a connection to network 100. Network administrator node 120 further comprises a computer platform 122 comprising an input mechanism 132 and an output mechanism 134. In some embodiments, input mechanism 132 comprises, but is not limited to, a mechanism such as a key or keyboard, a mouse, a touch-screen display, and/or a voice recognition module. In some embodiments, output mechanism 134 comprises, but is not limited to, a display, an audio speaker, and/or a haptic feedback mechanism.

Computer platform 122 also comprises a memory 136, which may comprise volatile and nonvolatile memory such as read-only and/or random-access memory (ROM and RAM), EPROM, EEPROM, flash cards, or any memory readable and/or writable by a processing device. Further, memory 136 may include one or more flash memory cells, or may comprise any secondary or tertiary storage device, such as magnetic media, optical media, tape, or soft or hard disk.

Network administrator node 120 further comprises a device configuration table 126 stored in memory 136. Manually compiled or automatically generated by network management application 125, device configuration table 126 comprises a listing interconnected switching devices including one or more of an IP address 148, a MAC address 150, and a DNS name 152 of each device. In some embodiments, device configuration table 126 includes all interconnected switching devices.

Network administrator node 120 further comprises a processor assembly 142, which may further comprise an application-specific integrated circuit (ASIC), or other chipset, processor, logic circuit, registers, and/or other data processing device operable to execute port identification module 124.

Additionally, processor assembly 142 may include one or a combination of processing subsystems 146 that perform specific operations and/or provide specific functionality required by network administrator node 120. In one aspect, processing subsystems 146 may include subsystems such as: sound, non-volatile memory, file system, transmit, receive, searcher, layer 1, layer 2, layer 3, secure socket layer (SSL), main control, remote procedure, power management, diagnostics, digital signal processor, messaging, call manager, user interface, sleep, data services, security, authentication, graphics, universal serial bus (USB), multimedia such as Moving Picture Experts Group (MPEG), General Packet Radio Service (GPRS), etc.

Furthermore, computer platform 122 comprises a communications module 144 embodied in hardware, software, and/or combinations thereof, communicatively couplable to receive/transmit and otherwise enable communication between components internal to network administrator node 120, as well as, to enable communications between the network administrator node and other devices, i.e., switches and routers, on network 100 and comprising SNMP agents.

In at least one embodiment, port identification module 124 resides in memory 136 and is loaded via various techniques including, but not limited to, removable media and receipt from a network server. Furthermore, port identification module 124, although a standalone diagnostic tool for troubleshooting network problems, may be integrated, and loaded into memory 136 along with other network management applications. One such network management application includes, PROCURVE NETWORK MANAGER™, available from the Hewlett-Packard Co., of Palo Alto, Calif.

In at least one embodiment, port identification module 124 comprises several software components including a network manager control logic 138 operable, in conjunction with a graphic user interface (GUI) 140, input mechanism 132 and output mechanism 134, to receive an end-node address and output to network administrator 128 information identifying the switch and switch port to which the end-node is physically attached.

Figure 3:
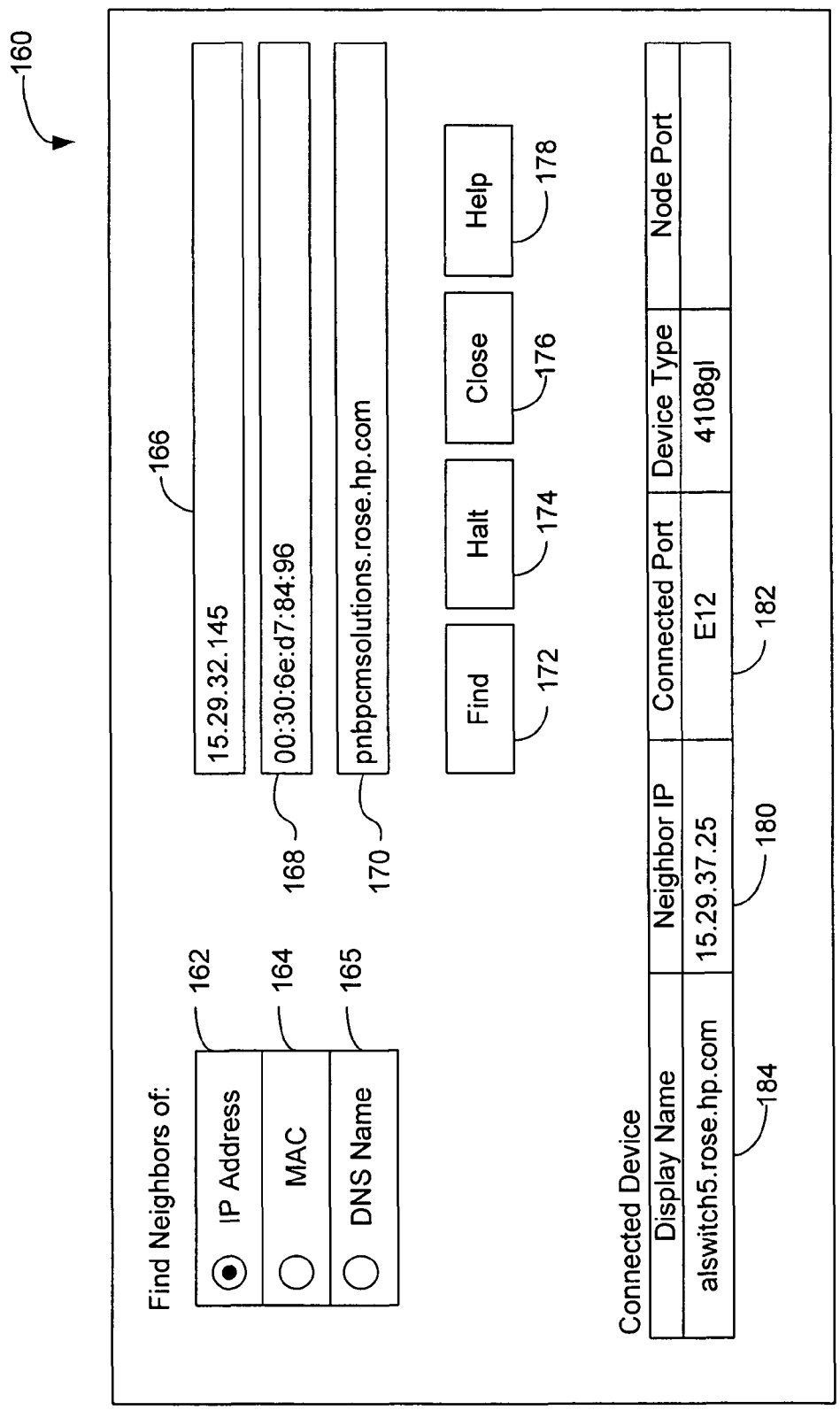
FIG. 3 is a screen display illustrating an embodiment of a graphic user interface (GUI)

FIG. 3 illustrates one embodiment of an input/output screen 160 displayable by output mechanism 134 on a display associated with network administrator node 120 and operable to facilitate the entry and display of the user entered end-node information and information regarding the physically attached switch and switch port. A user enters an end-node address in one of several formats, i.e., an IP address, a MAC address, and a DNS name, by an appropriate selection of controls 162, 164 and 165, e.g., operable in conjunction with GUI 140 and an attached computer pointing device, i.e., a "mouse". In some embodiments, a keyboard or other input mechanism may be used.

After an appropriate entry in one of fields 166, 168 and 170 using a keyboard or other input mechanism 132, the alternate address information is displayed in their corresponding display field. The address forwarding tables described above are indexed by MAC address. Accordingly, if the information provided by the user is not the MAC address, the MAC address is determined using various known techniques, including reading an address resolution protocol (ARP) cache of an interconnected switching device. Alternatively, the information may be provided by another network management application, or may be manually compiled.

Screen 160 may further include controls 172, 174, 176 and 178 for initiating a search for the attached port, halting the search, closing the window and for providing context sensitive help, respectively.

Upon entry of the end-node address in one of fields 166, 168, 170 and initiating the search by manipulating control 172, network manager control logic 138 determines the switch and/or switch port physically attached to the end-node and displays the search result in an appropriate field of display screen 160. Specifically, the port identification module 124 displays one or more of the DNS name, the IP address, and the connected port of the attached switch in fields 184, 180, and 182, respectively. In some embodiments, the port identification module 124 may be integrated within another software application. Accordingly, the input and output controls described above may be integrated in any screen display of any other application program and may include controls not associated with the functions of the apparatus and methods disclosed herein.

Figure 4:
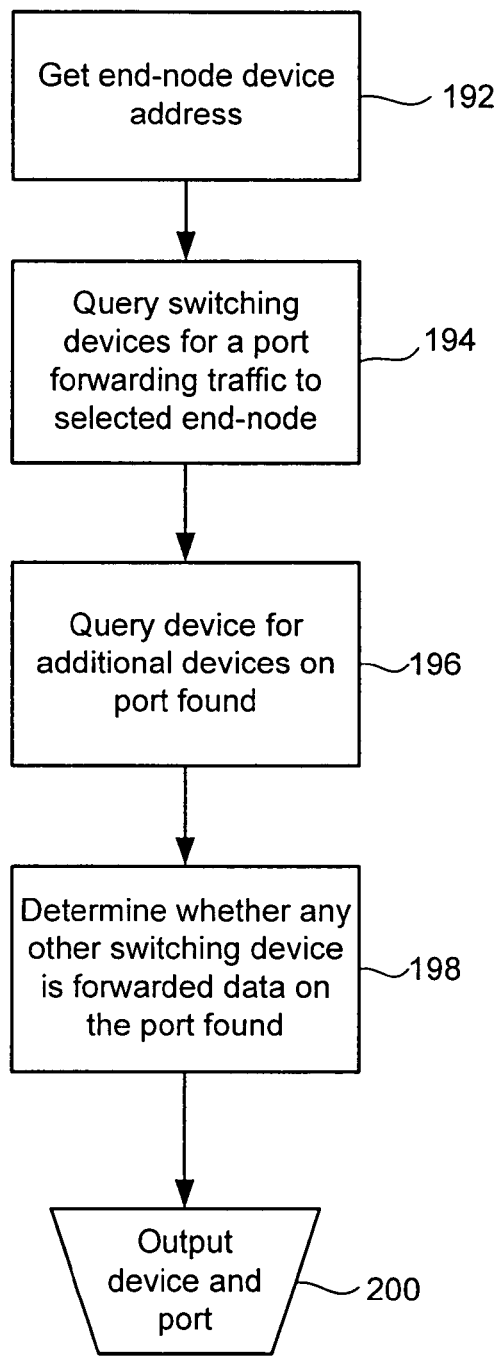
FIG. 4 illustrates an embodiment of a method of determining a switch port physically connected to an administrator selected end-node.

Referring to the flowchart of FIG. 4, a method of determining an attached switch port for a user selected end-node includes entering an address of an end-node at step 192, e.g., PC 114. For the purpose of describing this procedure, PC 114 is assumed to be generating a large volume of traffic on the network and the network administrator wishes to disable the port of the switch to which PC 114 is attached. The address of PC 114 is input via display screen 160 and GUI 140.

At step 194, network manager control logic 138 is operable to sequence through potential connected network switching devices in search of a device that forwards traffic to the predetermined end-node, i.e., PC 114. In some embodiments, network manager control logic 138 sequentially searches each potential connected network switching device.

Upon querying switch 108, port identification module 124 is notified that, as indicated by the address forwarding table of switch 108 listed in Table 1 below, packets are forwarded to PC 114 on port 119.

TABLE 1

| MAC ADDRESS | PORT |
| --- | --- |
| 00:30:6e:d7:94:80 (PC 116) | 113 |
| 00:30:6e:d7:94:92 (Server 118) | 113 |
| 00:30:6e:d7:94:88 (Printer 115) | 117 |
| 00:30:6e:d7:94:90 (PC 114) | 119 |
| 00:30:6e:d7:94:82 (Router 110) | 113 |
| 00:30:6e:d7:94:84 (Switch 102) | 113 |
| 00:30:6e:d7:94:88 (Switch 104) | 113 |
| 00:30:6e:d7:94:96 (Router 112) | 113 |

At step 196, the address forwarding table of switch 108, may be repeatedly queried as to whether a switching device of network 100, is forwarded traffic on port 119. If traffic destined for another device is forwarded on port 119, then switch 102 is not physically attached to PC 114, but rather to an intermediate switching device, and a next switching device is queried.

As Table 1 indicates; however, no network device other than PC 114 is forwarded packets on port 119. Accordingly, network manager control logic 138 may conclude that PC 114 is physically attached to port 119 of switch 108 and the switch and/or switch port information may be output to network administrator 128 at step 200. In some embodiments, the information is displayed on a display device using a screen display similar to that illustrated in FIG. 3.

Figure 5A:
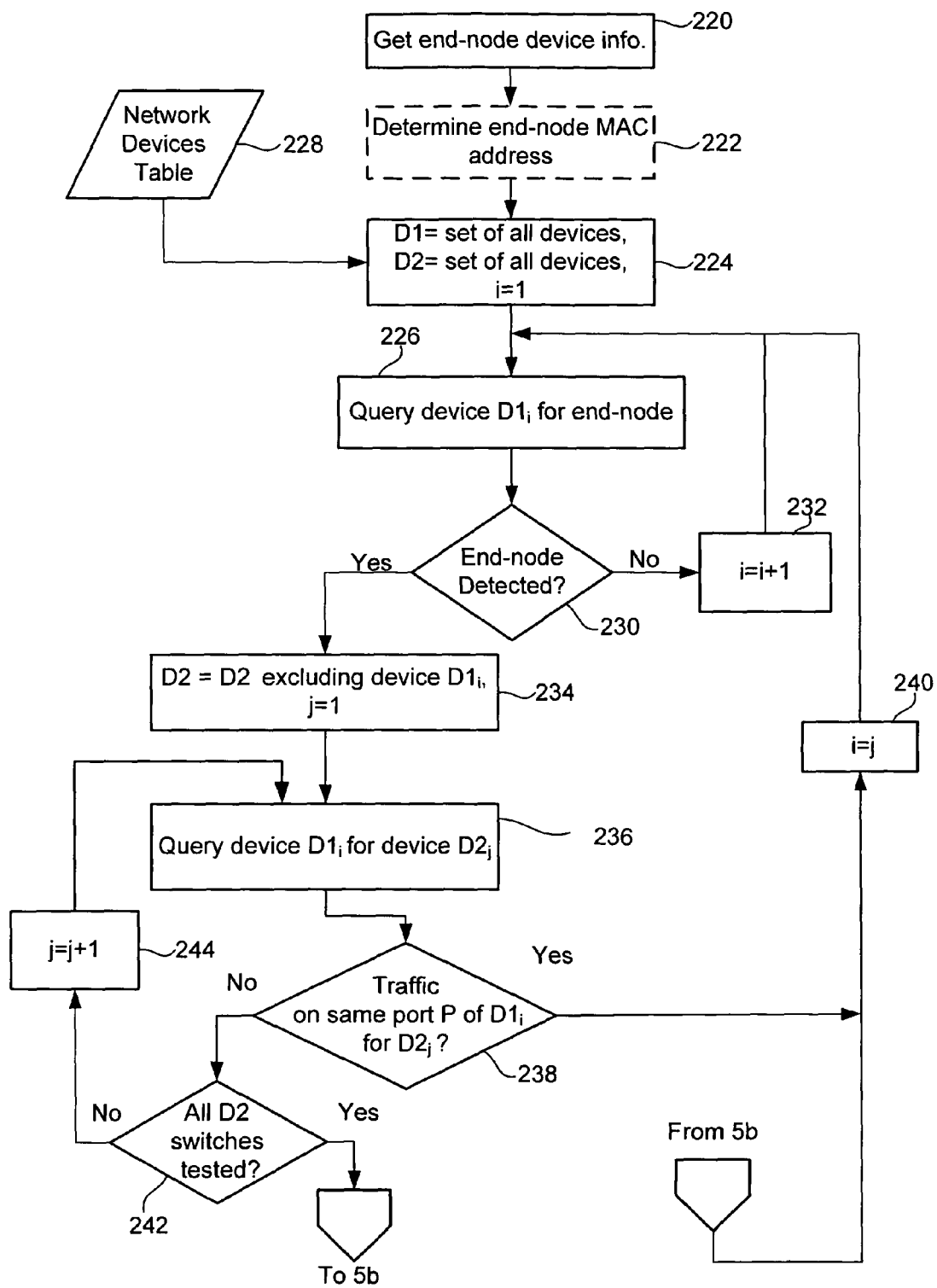
FIGS. 5a and 5b illustrate another embodiment of a method of determining a switch port physically connected to an administrator selected end-node.
Figure 5B:
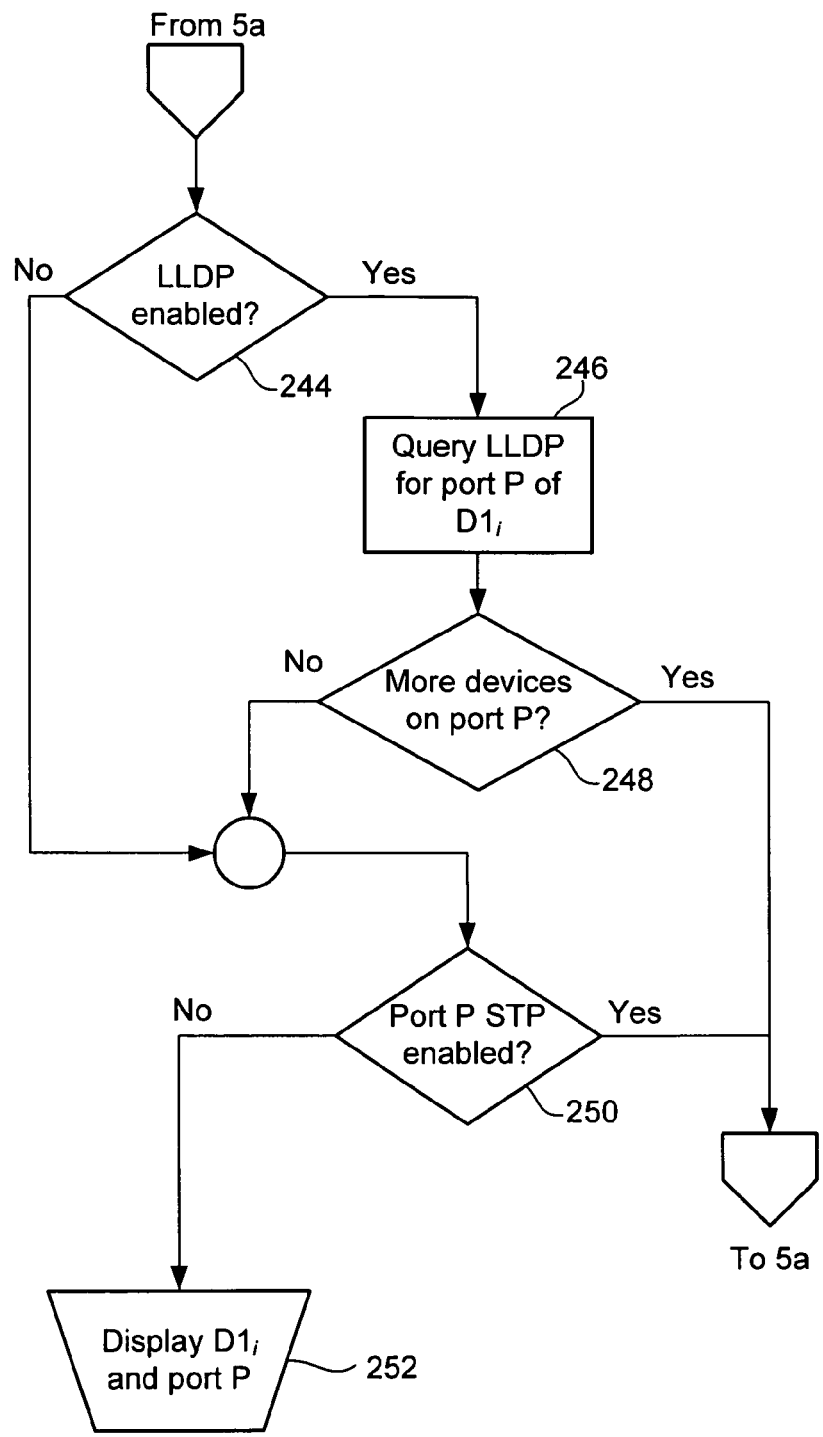

Turning now to the flowchart of FIGS. 5a and 5b, a more detailed method is described which enables a network manager 128, operating network administrator node 120, to quickly evaluate an attached switch and switch port for a given end-node, e.g., PC 114.

Similar to step 192 of FIG. 4, a user may request attached switch information for a given end-node by entering one of the IP address, the MAC address, and the DNS name of the end-node in question. As the Bridge MIB table is indexed by MAC address to quickly locate the requested data, if other than the MAC address is entered by the user, network manager control logic 138 is operable to derive, at optional step 222 (dashed line), the MAC address of the end-node by one of several known techniques, including querying another network manager application 125 and by querying an ARP cache of an interconnected switching device.

At step 224, network manager control logic 138 initializes network manager control logic 138 in preparation for sequencing through interconnected switches and routers comprising network 100 searching for a switching device that lists the MAC address of the requested end-node in that device's address forwarding table. Two sets of switching devices, D1 and D2 may be established that at this step comprise switching devices in network 100. A loop is initialized to facilitate sequencing through the devices, and comprises setting i, an index into set D1, initially to 1. In some embodiments, the loop is implemented in software. In some embodiments, the sets of switching devices include all switching devices in network 100.

At step 226, switching device $D1_i$, (the $i^{th}$ switching device in set D1), is queried by port identification module 124 to determine if any port forwards traffic to end-node PC 114. In some embodiments, a query command, e.g., an "SNMPGet" command, may be formulated and transmitted to device $D1_i$. The command is operable to query the device using the MAC address of end-node PC 114 as an index into $D1_i$'s Bridge MIB. In some embodiments, the entire Bridge MIB table need not be transmitted back to the network administrator node 120. If, at step 230, a response containing a port number, i.e., port 119, is returned, control is passed to step 234. If an error message indicating no port found is returned, index i is incremented at step 232 and step 226 is repeated using the next switching device in set D1 until a switching device is found that has end-node PC 114 in its bridge forwarding table.

Control is passed to step 234 after a switching device has been found that forwards data to end-node PC 114, port 119 of switch 108. Switch 108 may now be queried to determine if another switching device in network 100 is forwarded traffic on port 119. As previously explained, the Bridge MIB table is indexed by MAC address and cannot be queried by port number.

Therefore, the Bridge MIB of device D1i must be queried multiple times, each time using a MAC address of another switching device in network 100, each time determining if port 119 is forwarded traffic for any device other than end-node PC 114. Step 234 initializes a software loop eliminating switch 108 from set D2 because the switching device being queried does not direct traffic to itself and devices previously queried along the same path need not be repeated.

At step 236, the method may initialize an indexing variable j to 1 and begins looping through switch set D2, each time transmitting a query, e.g., an "SNMPGet" command to device $D1_i$ with a different index into the Bridge MIB, the index being the MAC address of device $D2_j$. The process checks the port returned, and if $D1_i$ forwards traffic to $D2_j$ on port 119, the port is connected to a switch or router in the path to end-node PC 114 and is not physically attached to the end-node itself. Accordingly, in one embodiment, the process exits the loop at step 238, setting index i to j at step 240, and passes control to step 226, which then interrogates device $D2_j$.

Steps 242 and 244 involve a looping mechanism to test whether the Bridge MIB has been queried with the devices in D2, incrementing index j as appropriate. If no device D2 is forwarded traffic on device $D1_i$ port 119, then port 119 is a candidate for the physically attached switch port of end-node PC 114. Control passes to step 244 on FIG. 5b.

Referring now to step 244 on FIG. 5b, the method determines whether device $D1_i$ comprises an agent supporting Link Layer Discovery Protocol (LLDP). LLPD is a media independent protocol allowing an LLPD agent to learn higher level management reachability and connection endpoint information from adjacent devices. A LLPD Bridge MIB, indexed by port number, may be sent a query, e.g., an SNMPGet query with a port number as an argument, to return all switching devices forwarded packets on a particular port. Although this may provide an efficient search tool, not all SNMP enabled devices support LLDP. Accordingly at step 244, device $D1_i$ is tested for LLDP support prior to issuing the query.

If $D1_i$ does not support LLDP, control passes to step 250. On the other hand, if $D1_i$ supports LLPD, the LLDP Bridge MIB on device $D1_i$ is queried, at step 246, using port 119 as an argument. If no routers or switches are discovered on port 119, then control passes to step 250 which tests whether the port is STP enabled.

STP (Spanning Tree Protocol) is a network management protocol that may be supported by switching devices on network 100. As STP is a link management protocol providing path redundancy while preventing undesirable loops in the network, if a particular port status indicates that STP is enabled, then that port is physically attached to a switch or router instead of an end-node. If not STP-enabled, port identification module 124 may conclude that port 119 is connected to end-node PC 114 and control passes to step 252.

However, if the LLPD Bridge MIB query at step 246 indicates that there are more switching devices on port 119, or the port status check at step 250 indicates that the port is STP-enabled, the port is not connected to the end-node and control passes back to step 240 on FIG. 5*a*.

The above described apparatus and methods return a switch and/or switch port to which a given end-node is connected. In at least one embodiment, the switch and/or switch port information obtained identifies the switch to which the given end-node is directly connected without any further communication devices between the end-node and the switch. The procedures use real time address forwarding information queried from MIBs resident in routers and switches populating network 100 and do not require the downloading of entire MIB tables.

What is claimed is:

1. A method performed on a computer system including a computer storage medium for determining a network switching device in a network and port of the network switching device to which a predetermined end-node is connected, comprising:

receiving an address of a predetermined end node;

identifying a plurality of network switching devices that forward data to the predetermined end node by sequentially querying network switching devices in the network using the address of the predetermined end node and an address-forwarding table in each of the network switching devices;

for a first identified network device of the identified plurality of network devices, discovering a port on the first identified network switching device that forwards data to the predetermined end-node;

determining whether the first identified network switching device is directly connected to the predetermined end node, rather than connected to the predetermined end node via an intermediate switch, wherein the determining includes repeatedly querying the address-forwarding table of the first identified network switching device to determine whether the discovered port of the first identified network device forwards data to another device in addition to the predetermined end node; and if the first identified network switching device is connected to the predetermined end node via an intermediate switch, then, for at least one other identified network switching device of the plurality of identified network switching devices, determining whether the at least one other identified network switching device is directly connected to the predetermined end node;

if the first identified network switching device is directly connected to the predetermined end node, outputting an address of the first identified network switching device and discovered port.

2. The method of claim 1, wherein the discovering step comprises:

transmitting at least one command comprising a MAC address to the first identified network switching device, the at least one command operable to query the address forwarding table resident on the first identified network switching device; and receiving a port address from the first identified network switching device, the port address identifying a port to which the first identified network switching device forwards data to the predetermined end-node.

3. The method of claim 1, wherein the repeatedly querying step includes:

determining that the address forwarding table of the first identified network switching device does not include another switching device with the same forwarding port as the predetermined end-node, wherein the address forwarding table comprises the predetermined end-node and a forwarding port.

4. The method of claim 1, wherein the repeatedly querying step includes:

determining that the address forwarding table of the first identified network switching device comprising the predetermined end-node and a forwarding port forwards data on the discovered port only to the predetermined end-node, wherein the address forwarding table comprises the predetermined end-node and the discovered port.

5. The method of claim 1, wherein the sequentially querying step comprises sequentially querying all potential connected network switching devices in the network.

6. The method of claim 1, further comprising transmitting at least one SNMP command to a network switching device, the SNMP command comprising a MAC address.

7. The method of claim 1, further comprising transmitting a command to a network switching device, the command operable to return a MAC address of each network switching device forwarding traffic on a particular port.

8. The method of claim 7, further comprising determining whether a port in the first identified network switching device is spanning tree protocol enabled.

9. A method performed on a computer system including a computer storage medium for determining a network switching device in a network and port of the network switching device to which a predetermined end-node is connected, comprising:

receiving an address of a predetermined end node;

identifying a plurality of network switching devices that forward data to the predetermined end node by sequentially querying network switching devices in the network using the address of the predetermined end node and an address-forwarding table in each of the network switching devices;

for a first identified network switching device of the plurality of identified network switching devices, discovering a port on the first identified network switching device that forwards data to the predetermined end-node;

determining whether the first identified network switching device is directly connected to the predetermined end node,
    wherein the determining includes repeatedly querying the address-forwarding table of the first identified network switching device whether the discovered port forwards data to another device in addition to the predetermined end node; and
    if the first identified network switching device is not directly connected to the predetermined end node, then, for at least one other identified network switching device of the plurality of identified network switching devices, determining whether the at least one other identified network switching device is directly connected to the predetermined end node;
if the first identified network switching device is directly connected to the predetermined end node, outputting an address of the first identified network switching device and discovered port.

10. The method of claim 1, further comprising transmitting a command to the first identified network switching device determining whether a particular switch port is spanning tree protocol enabled.

11. A computer system, comprising:
a computer platform connected to a network, the computer platform comprising:
    a processor;
    a memory accessible by the processor;
    an output mechanism; and
    a port identification module resident in the memory, the port identification module operable, when executed by the processor, to:
        determine a network switching device and switch port to which a predetermined end-node is attached by sequentially querying network switching devices in the network to identify a first network switching device and a corresponding switch port that forwards data to the predetermined end node using the address of the predetermined end node and an address-forwarding table in each of the network switching devices;
        determine whether the first identified network switching device is directly connected to the predetermined end-node, rather than attached to the predetermined end node via an intermediate switch,
            wherein the determining includes repeatedly querying the address-forwarding table of the first identified network switching device to determine whether the determined switch port forwards data to another device in addition to the predetermined end node; and
        if the first identified network switching device is directly connected to the predetermined end node, output an address of the first identified network switching device and determined switch port to the output mechanism.

12. The computer system of claim 11, further comprising a network management application operable to discover all interconnected switching devices in the computer network.

13. The computer system of claim 11, further comprising an input mechanism by which a user is able to enter an identifier of the predetermined end-node.

14. A non-transitory computer storage medium comprising instructions which, when executed by a computer, cause the computer to:
receiving an address of a predetermined end node;
discover a plurality of network switching devices that forward data to the predetermined node by sequentially querying network switching devices in a network using the address of the predetermined end node and an address-forwarding table of each of the network switching devices;
for a first discovered network switching device of the plurality of discovered network switching devices, discover a switch port on the first discovered network switching device that forwards data to the predetermined end node;
determine that the discovered switch port of the first discovered network switching device forwards data solely to the predetermined end-node,
    wherein the determine includes repeatedly querying the address forwarding table of the first discovered network switching device as to whether the discovered switch port forwards data to another network switching device in addition to the predetermined end node; and
if the discovered switch port of the first discovered network switching device forwards data solely to the predetermined end node, output an address of the first discovered network switching device and the discovered switch port.

15. The medium of claim 14, further comprising instructions which, when executed by a computer, cause the computer to discover all potential connected network switching devices in a network.

16. The medium of claim 14, further comprising instructions which, when executed by a computer, cause the computer to transmit at least one SNMP command to the first discovered network switching device, the SNMP command comprising a MAC address.

17. The medium of claim 14, further comprising instructions which, when executed by a computer, cause the computer to transmit a command to the discovered network switching device, the command operable to return an IP address of the discovered network switching device forwarding data on the discovered switch port.

18. The medium of claim 14, further comprising instructions which, when executed by a computer, cause the computer to determine whether the discovered switch port is spanning tree protocol enabled.

19. The method of claim 1, wherein the discovering step comprises:
initializing a first loop mechanism to search in a first set of network switching devices for any port of a network switching device in the first set that forwards data to the predetermined end-node; and
wherein the determining step comprises:
initializing a second loop mechanism to search in a second set of network switching devices to determine whether any network switching device in the second set of network switching devices forwards data to the discovered port.

20. The method of claim 9, wherein the discovering step comprises:
initializing a first loop mechanism to search in a first set of network switching devices for any port of a network switching device in the first set that forwards data to the predetermined end-node; and
wherein the determining step comprises:
initializing a second loop mechanism to search in a second set of network switching devices to determine whether any network switching device in the second set of network switching devices forwards data to the discovered port.

21. The computer system of claim 11, wherein the function of determining a network switching device and switch port comprises: initialize a first loop mechanism to search in a first set of network switching devices for any port that forwards data to the predetermined end-node; and wherein the function of determining whether the determined switch port is forwarded data intended only for the predetermined end-node comprises: initialize a second loop mechanism to search in a second set of network switching devices to determine whether any network switching device in the second set of network switching devices forwards data to the determined port.

22. The computer storage medium of claim 14, wherein the discover function comprises: initialize a first loop mechanism to search in a first set of network switching devices for any port that forwards data to the predetermined end-node; and wherein the determine function comprises: initialize a second loop mechanism to search in a second set of network switching devices to determine whether any network switching device in the second set of network switching devices forwards data to the discovered port.

\* \* \* \* \*